(12) United States Patent
Be et al.

(10) Patent No.: US 10,374,298 B2
(45) Date of Patent: Aug. 6, 2019

(54) ANTENNA HOUSING (71) Applicant: Ford Global Technologies, LLC, Dearborn, MI (US)

(72) Inventors: Tuan Anh Be, Livonia, MI (US); Allen R. Murray, Lake Orion, MI (US); David Joseph Orris, Allen Park, MI (US); Oliver Lei, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 15/237,504

(22) Filed: Aug. 15, 2016

(65) Prior Publication Data
US 2018/0048060 A1 Feb. 15, 2018

(51) Int. Cl.
*H01Q 1/32* (2006.01)
*H01Q 1/22* (2006.01)
*H01Q 1/48* (2006.01)
*H01Q 1/02* (2006.01)
*H01Q 1/42* (2006.01)

(52) U.S. Cl.
CPC ............. *H01Q 1/3275* (2013.01); *H01Q 1/02* (2013.01); *H01Q 1/2291* (2013.01); *H01Q 1/42* (2013.01); *H01Q 1/48* (2013.01)

(58) Field of Classification Search
None
See application file for complete search history.

(56) References Cited

U.S. PATENT DOCUMENTS

| | | | | |
|---|---|---|---|---|
| 4,163,535 A | * | 8/1979 | Austin | B64C 39/024 244/17.11 |
| 6,282,969 B1 | | 9/2001 | Daniel | |
| 8,180,547 B2 | | 5/2012 | Prasad et al. | |
| 8,220,866 B1 | * | 7/2012 | Hart | B62D 25/04 296/193.09 |
| 10,000,207 B2 | * | 6/2018 | Lavoie | B60W 30/06 |
| 2004/0056779 A1 | * | 3/2004 | Rast | B63B 22/16 340/985 |

(Continued)

FOREIGN PATENT DOCUMENTS

DE 19850639 A1 5/1999
JP 02154502 A 6/1990

(Continued)

OTHER PUBLICATIONS

Lockheed Martin, *Core System Requirements Specification (SyRS)*, U.S. Department of Transportation, Research and Innovative Technology Administration, Apr. 2011 (131 Pages).

(Continued)

*Primary Examiner* — Trinh V Dinh
(74) *Attorney, Agent, or Firm* — Frank Lollo; Neal, Gerber & Eisenberg LLP; James P. Muraff (57) ABSTRACT

An antenna housing assembly includes: a first housing enclosing an antenna assembly and a grounding plate; a second housing enclosing the first housing and a heating ring defining apertures and comprising resistive heating elements; a wiper blade driven by a motor and rotatable about the second housing to clear snow from an exterior of the second housing. The antenna assembly and the grounding plate are located vertically above a top-most surface of the heating ring.

18 Claims, 8 Drawing Sheets

(56) References Cited

U.S. PATENT DOCUMENTS

| | | | |
|---|---|---|---|
| 2007/0120759 A1* | 5/2007 | Hawes | H01Q 1/02 343/872 |
| 2010/0245189 A1 | 9/2010 | Wang | |
| 2013/0229315 A1* | 9/2013 | Duzdar | H01Q 1/3275 343/713 |
| 2014/0110400 A1* | 4/2014 | Swain | H05B 3/34 219/552 |
| 2014/0347231 A1 | 11/2014 | Kerselaers et al. | |
| 2016/0104932 A1* | 4/2016 | Aminzadeh | H01Q 1/3275 343/872 |
| 2017/0317407 A1* | 11/2017 | Yasin | H01Q 1/3275 |
| 2017/0334366 A1* | 11/2017 | Sliwa | B60R 11/04 |

FOREIGN PATENT DOCUMENTS

| | | |
|---|---|---|
| JP | H0479602 A | 3/1992 |
| JP | H04329002 A | 11/1992 |
| JP | 2000091821 A | 9/1998 |
| JP | 2000091821 A | 3/2000 |
| WO | WO 2015/199177 A1 | 12/2015 |

OTHER PUBLICATIONS

Unpublished pending U.S. Appl. No. 14/991,496, filed Jan. 8, 2016 which is not being furnished herewith, pursuant to the Commissioner's Notice dated Sep. 21, 2004.

Unpublished pending U.S. Appl. No. 15/186,850, which is not being furnished herewith, pursuant to the Commissioner's Notice dated Sep. 21, 2004.

Unpublished pending U.S. Appl. No. 14/972,761, which is not being furnished herewith, pursuant to the Commissioner's Notice dated Sep. 21, 2004.

Search Report dated Feb. 6, 2018 for GB Patent Application No. 1712842.2 (5 pages).

\* cited by examiner

ANTENNA HOUSING

TECHNICAL FIELD

This document relates to housings for antennas.

BACKGROUND

Vehicles include antennas for wireless communication. The wireless communication may include cellular communication and intra-vehicle communication. A housing is needed to protect antennas from ambient conditions such as cold temperatures and precipitation.

SUMMARY

An antenna housing assembly includes: a first housing enclosing an antenna assembly and a grounding plate; a second housing enclosing the first housing and a heating ring defining apertures and comprising resistive heating elements; a wiper blade driven by a motor and rotatable about the second housing to clear snow from an exterior of the second housing. The antenna assembly and the grounding plate are located vertically above a top-most surface of the heating ring.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

Figure 1:
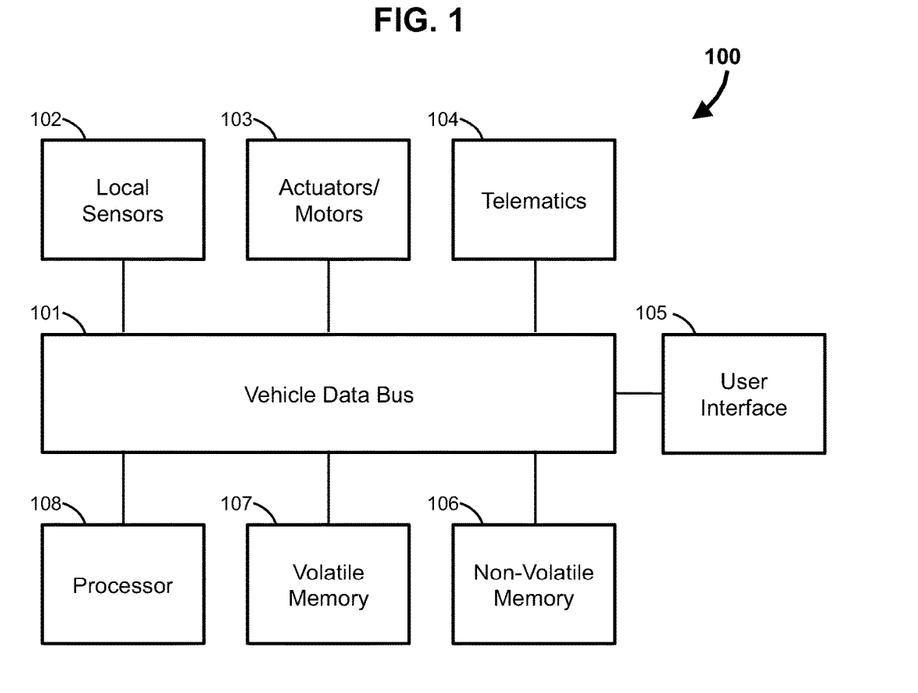
FIG. 1 is a block diagram of a vehicle computing system.

FIG. 1 shows a computing system 100 of an example vehicle 200. The vehicle 200 includes a motor, a battery, at least one wheel driven by the motor, and a steering system configured to turn the at least one wheel about an axis. Suitable vehicles are also described, for example, in U.S. patent application Ser. No. 14/991,496 to Miller et al. ("Miller"), U.S. Pat. No. 8,180,547 to Prasad et al. ("Prasad"), U.S. patent application Ser. No. 15/186,850 to Lavoie et. al. ("Lavoie") and U.S. patent application Ser. No. 14/972,761 to Hu et al. ("Hu"), all of which are hereby incorporated by reference in their entireties.

The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3G, LTE), USB, etc. The telematics unit 104 may be configured to broadcast signals at a certain frequency. The telematics unit may wireless broadcast some of the signals via one or more antennas housed with an antenna assembly 301.

The actuators/motors 103 produce physical results. Examples of actuators/motors include fuel injectors, windshield wipers, brake light circuits, transmissions, airbags, engines, power train motors, steering, lights (as discussed below), etc. The local sensors 102 transmit digital readings or measurements to the processor 108. Examples of suitable sensors include temperature sensors, rotation sensors, capacitance sensors, load sensors, seatbelt sensors, speed sensors, cameras, lidar sensors, radar sensors, etc. It should be appreciated that the various connected components of FIG. 1 may include separate or dedicated processors and memory. Further detail of the structure and operations of the computing system 100 is described, for example, in Miller and/or Prasad.

Figure 2:
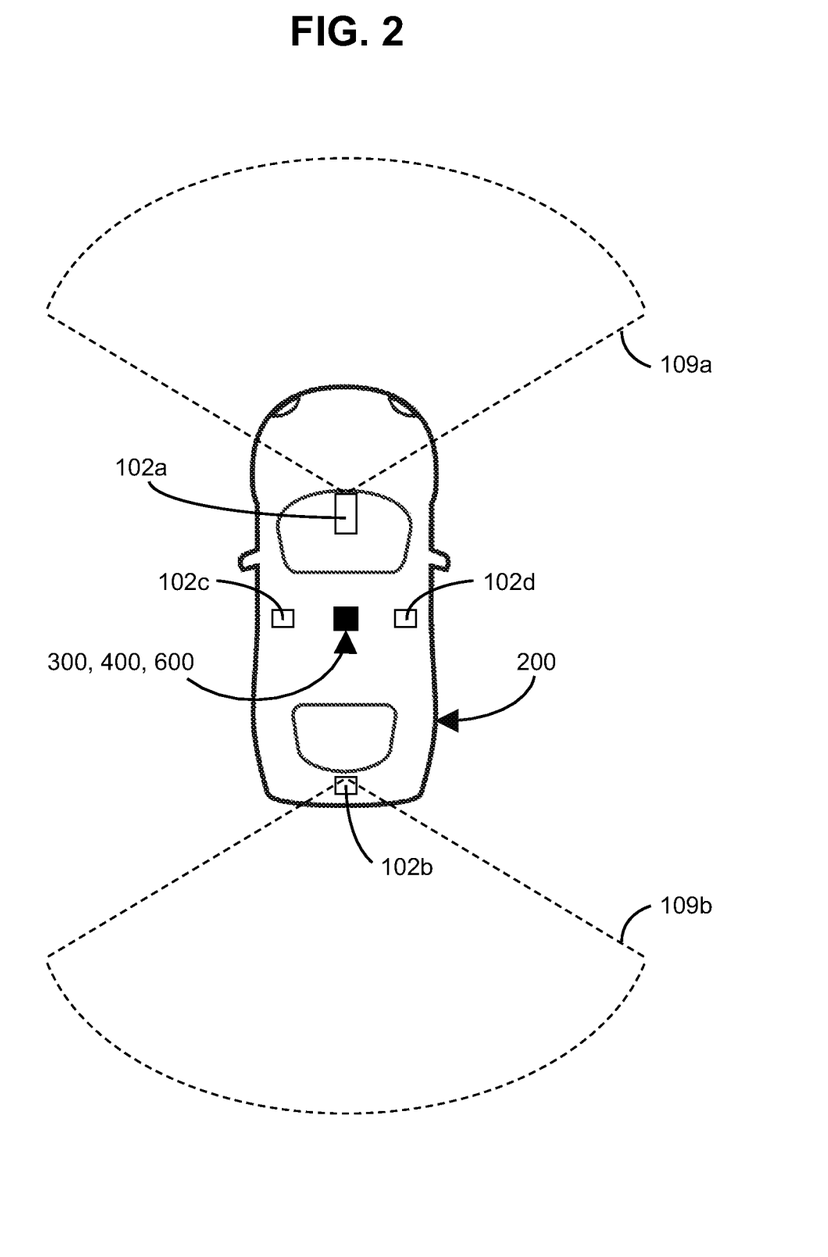
FIG. 2 is a top plan view of a vehicle including the vehicle computing system.

FIG. 2 generally shows and illustrates the vehicle 200, which includes the computing system 100. Although not shown, the vehicle 200 is in operative wireless communication with a nomadic device, such as a mobile device or a smartphone. Some of the local sensors 102 are mounted on the exterior of the vehicle 200. Local sensor 102*a* may be an ultrasonic sensor, a lidar sensor, a camera, a video camera, and/or a microphone, etc. Local sensor 102*a* may be configured to detect objects leading the vehicle 200. Local sensor 102*b* may be an ultrasonic sensor, a lidar sensor, a camera, a video camera, and/or a microphone, etc. Local sensor 102*b* may be configured to detect objects trailing the vehicle 200 as indicated by trailing sensing range 109*b*. Left sensor 102c and right sensor 102d may be configured to perform the same functions for the left and right sides of the vehicle 200. The vehicle 200 includes a host of other sensors 102 located in the vehicle interior or on the vehicle exterior. These sensors may include any or all of the sensors disclosed in Prasad. An antenna housing 300, 400, 600 (discussed below) is mounted on the roof of the vehicle.

It should be appreciated that the vehicle 200 is configured to perform the methods and operations described below. In some cases, the vehicle 200 is configured to perform these functions via computer programs stored on the volatile and/or non-volatile memories of the computing system 100. A processor is "configured to" perform a disclosed operation when the processor is in operative communication with memory storing a software program with code or instructions embodying the disclosed operation. Further description of how the processor, memories, and programs cooperate appears in Prasad. It should be appreciated that the nomadic device or an external server in operative communication with the vehicle 200 perform some or all of the methods and operations discussed below.

According to various embodiments, the vehicle 200 includes some or all of the features of the vehicle 100a of Prasad. According to various embodiments, the computing system 100 includes some or all of the features of the VCCS 102 of FIG. 2 of Prasad. According to various embodiments, the vehicle 200 is in communication with some or all of the devices shown in FIG. 1 of Prasad, including the nomadic device 110, the communication tower 116, the telecom network 118, the Internet 120, and the data processing center 122.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels."

According to some embodiments, the vehicle 200 is configured for intra-vehicle communication via Dedicated Short Range Communications (DSRC). The telematics unit 104 may send and receive DSRC signals via the antenna 301.

DSRC is a wireless communication protocol or system, mainly meant for transportation, operating in a 5.9 GHz spectrum band. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications (GPRS, 3G, LTE, among others), and short range radar, allowing vehicles to communicate their position, speed, heading, relative position to other objects and to exchange information with other vehicles or external computer systems. DSRC systems can be integrated with other systems such as mobile phones. Currently, the DSRC network is identified under the DSRC abbreviation or name. However, other names are sometimes used, usually related to a Connected Vehicle program or the like. More information on the DSRC network and how the network may communicate with vehicle hardware and software is available in the U.S. Department of Transportation's Core June 2011 System Requirements Specification (SyRS) report, published on Jun. 13, 2011 and (available at http://www.its.dot.gov/meetings/pdf/CoreSystem_SE_SyRS_RevA %20(2011-06-13) .pdf), which is hereby incorporated by reference in its entirety along with all of the documents referenced on pages 11 to 14 of the SyRS report.

Figure 3A:
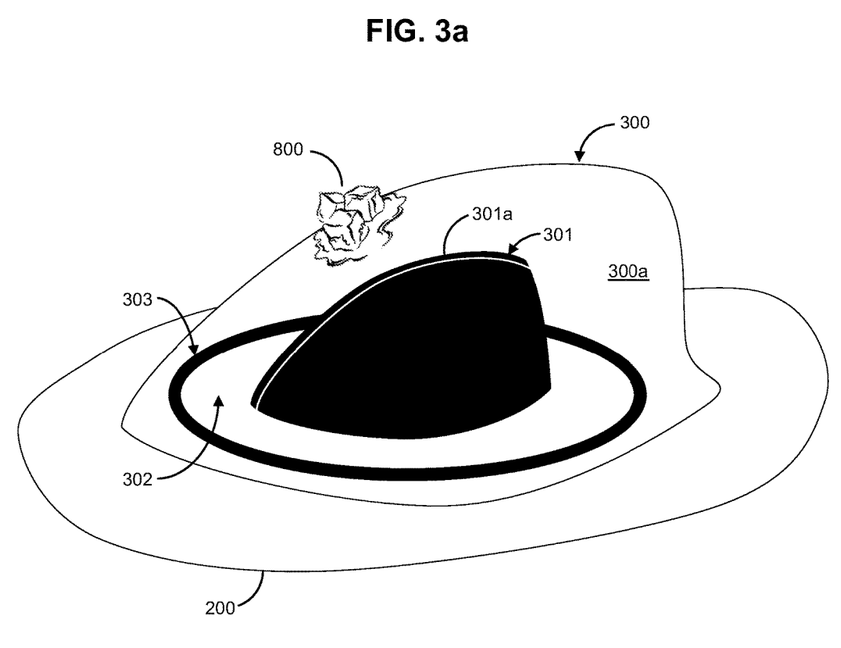
FIG. 3*a* is a perspective view of an antenna housing assembly.

FIG. 3a shows and illustrates a first antenna protector housing 300. The first antenna protector housing 300 is configured to surround and protect the antenna assembly 301. The antenna assembly 301 may include (but does not require) a housing 301a, which surrounds various electronic antenna components (not shown). The housing 301a and the various electronic antenna components (not shown) are known in the art and commercially available. As stated above, the various electronic antenna components are configured for DSRC communication and may thus broadcast signals in the 5.9 GHz spectrum band. The antenna of the antenna assembly is in operative wired communication with the computing system 100.

The antenna assembly 301 sits on a metallic grounding plate 302. As shown in FIG. 3a, the grounding plate 302 has a larger surface area than the antenna assembly 301 and thus fully surrounds a bottom surface of the housing 301a. The grounding plate 302 is electrically grounded, thus enabling the antenna assembly 301 to operate at a desired electric frequency.

A heating ring 303 surrounds the grounding plate 302. The heating ring 303 is configured to (a) heat the antenna assembly 301 and (b) heat the first antenna protector housing 300. The heating ring 303 may be metallic to shield electromagnetic radiation emanating from the heating elements 502 (discussed below).

Figure 4A:
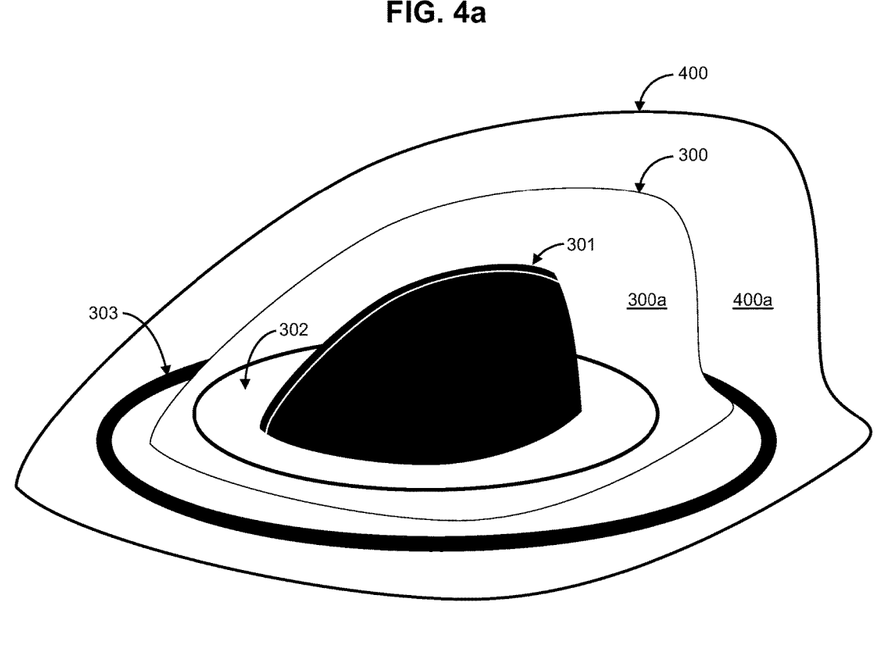
FIG. 4*a* is a perspective view of an antenna housing assembly
Figure 4B:
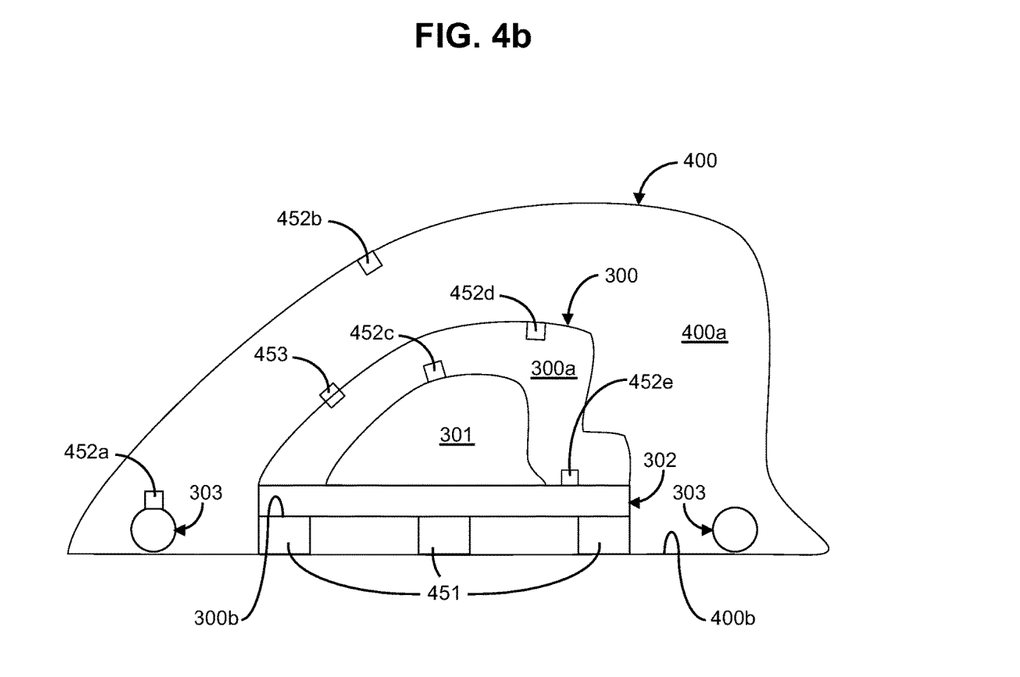
FIG. 4*b* is a cross sectional side view of the antenna housing assembly of FIG. 4*a*.
Figure 5:
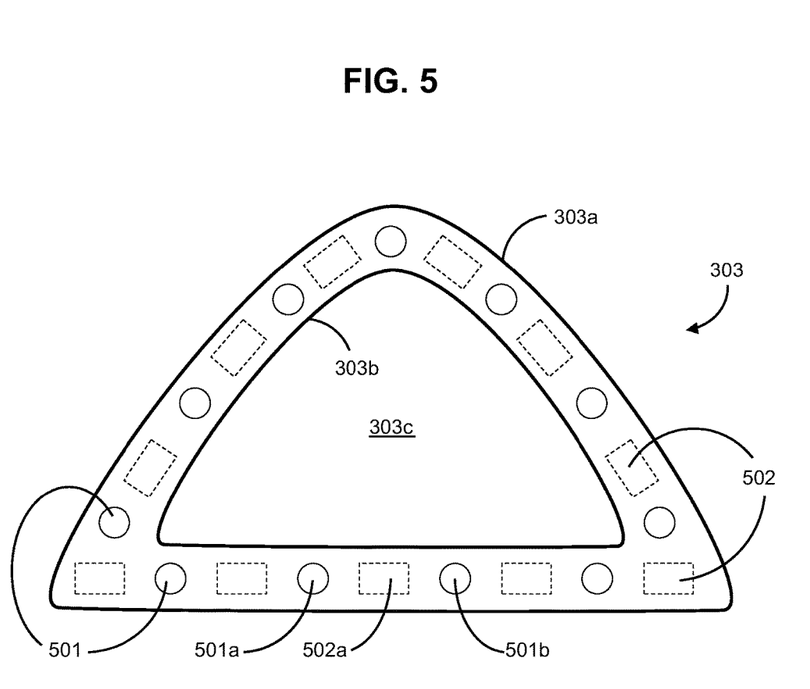
FIG. 5 is a top plan view of a heating ring.

As shown in FIG. 4b, the heating ring 303 has a generally circular cross section. As shown in FIG. 5, an outer perimeter 303a of the heating ring 303 may be generally triangular or horseshoe shaped from a top plan view. This is not required and the outer perimeter 303a of the heating ring 303 may have any suitable shape, such as an oval or a circle. As shown in FIG. 5, the heating ring 303 includes an inner perimeter 303b defining a central void 303c. According to some embodiments, the grounding plate 302 may sit inside the central void 303c. According to preferred embodiments, the grounding plate 302 sits vertically above the central void 303c and thus sits above a top-most surface of the heating ring 303. According to preferred embodiments, no portion of the heating ring 303 is in direct physical contact with the grounding plate 302.

Similar to the outer perimeter 303a, the inner perimeter 303b of the heating ring 303 may be triangular or horseshoe shaped as shown in FIG. 5, or may have any suitable shape such as an oval or a circle. According to some embodiments, the heating ring 303 is made from a tube bent into the appropriate geometry and thus has a constant thickness between the outer perimeter 303a and the inner perimeter 303b.

With continued reference to FIG. 5, the heating ring 303 defines a plurality of heating apertures (i.e., holes) 501. Although FIG. 5 shows the heating apertures being defined on a top surface of the heating ring 303, the apertures may be defined on side surfaces of the heating ring 303 or bottom surfaces of the heating ring 303.

The heating ring 303 includes and encapsulates a plurality of heating elements 502. The heating elements 502 may be resistive heating elements connected in series or in parallel. Resistive heating elements are generally known in the art and produce heat by resisting electrical current passed therethrough. It should be appreciated that the computing system 100 is configured to control the degree of electrical current passed through the heating elements 502 and thereby controls the amount of heat output by the heating element 303. The heating ring 303 includes a wire that is electrically grounded to sheet metal. The wire is electrically grounded to the sheet metal at a location vertically below the grounding plate 302. The heating elements 502 are in electrical communication with the wire.

The computing system 100 may control the heating elements 502 by turning a selected number of the heating elements 502 off and/or controlling the amount of electrical current passed through some or all of the heating elements 502. The heating elements 502 of FIG. 5 are shown in dashed lines because the heating elements 502 reside within the heating ring 303 and are thus not visible from the exterior of the heating ring 303. The computing system 100 may control the heating elements 502 based on readings from one or more temperature sensors 452 (discussed below).

As shown in FIG. 5, the heating elements 502 may be circumferentially spaced from the heating apertures 501. In other words, no heating aperture 501 is defined along the same circumferential point as a heating element 502. For example, first heating element 502a is located circumferentially between first heating aperture 501a and second heating aperture 501b. Such a configuration enables the heating ring 303 to confine or attenuate electromagnetic radiation produced by the heating elements 502a. Stated differently, if the heating elements 502 were located at the same circumferential locations as the heating apertures 501 (i.e., the heating elements 502 were located directly below the heating apertures 501), electromagnetic radiation could leak out of the heating ring 303 and interfere with signals generated by the antenna assembly 301.

With reference to FIGS. 3a and 4b, the first antenna protector housing 300 is shark-fin shaped and includes a flat lower inner surface 300b. The first antenna protector housing 300 defines an inner void 300a that accommodates the antenna assembly 301, the grounding plate 302, and the heating ring 303. The first antenna protector housing 300 is made from a non-conductive material (e.g., a polymer or a plastic) to avoid interference with signals generated by the antenna assembly 301. The heating ring 303 sits on the flat lower inner surface 300b. The grounding plate 302 may sit on the flat lower inner surface 300b coplanar with the heating ring 303 or may be raised, via spacers 451 (see FIG. 4b) above the flat lower inner surface. The antenna assembly 301 sits directly on the ground plate 303. According to some embodiments, the heating ring 303 is flush with an outer perimeter of the flat lower inner surface 300b of the first antenna protector housing 300 and thus has an outer perimeter that matches the outer perimeter of the flat lower inner surface 300b.

As shown in FIG. 3a, ice 800 has accumulated on the first antenna protector housing 300. The heating ring 303 has heated the antenna protector housing 300, thus causing the ice 800 to melt. As shown in FIG. 3a, the first antenna protector housing 300 sits on the roof of the vehicle 200. It should thus be appreciated that a lower external surface of the antenna protector housing 300 may be shaped to lie flush against the roof of the vehicle 200.

Figure 3B:
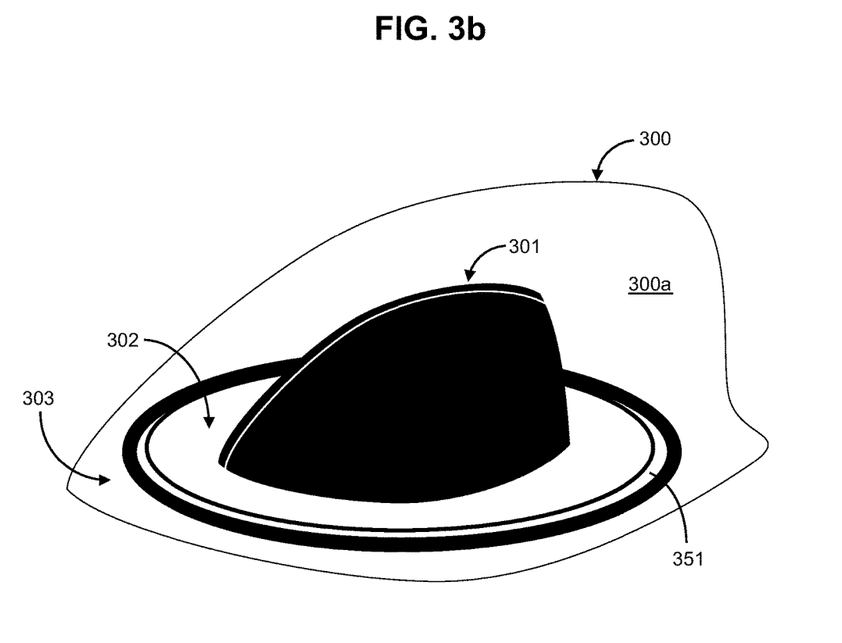
FIG. 3*b* is a perspective view of an antenna housing assembly.
Figure 6:
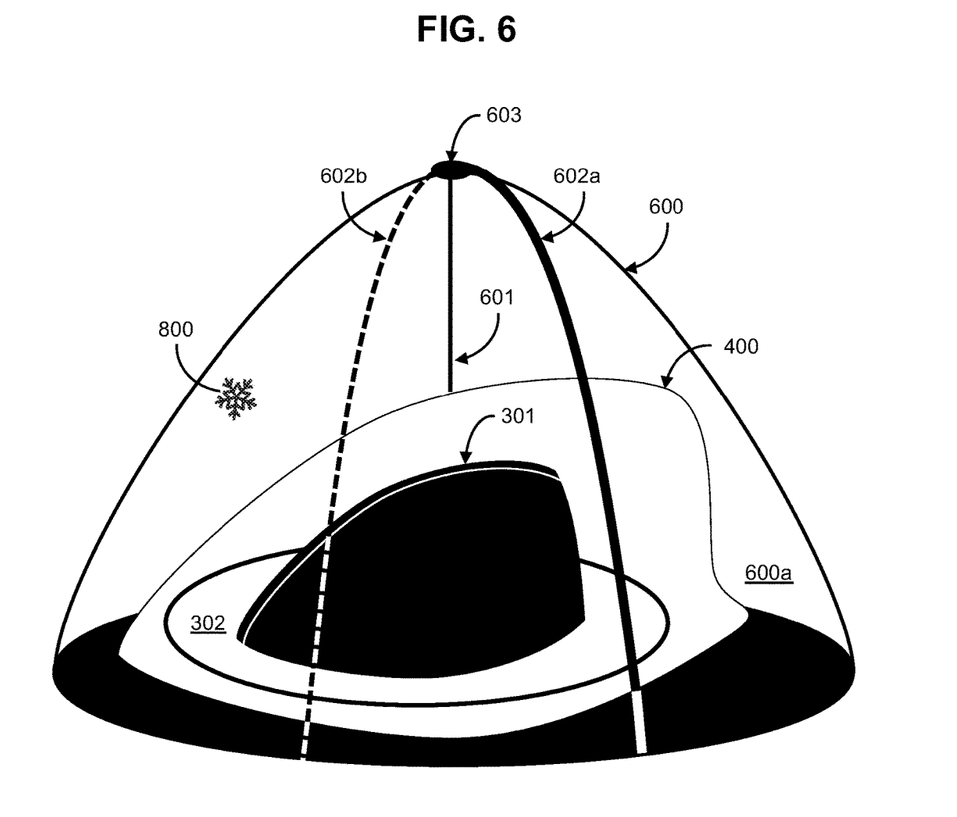
FIG. 6 is a perspective view of an antenna housing assembly.

Although the roof of the vehicle 200 is not shown in FIG. 3b, 4a, or 6, it should be appreciated that all of these antenna protector housings similarly sit flush on the roof of the vehicle 200. According to some embodiments, the first antenna protector housing 300 is sealed to prevent precipitation (e.g., water) and air from infiltrating into the inner void 300a. It should be appreciated that all disclosed antenna protector housings may be similarly sealed.

FIG. 3b shows the grounding plate 302 sitting vertically above the heating ring 303. The heating ring 303 has a greater circumference than the grounding plate 302 such that a radial gap 351 is defined between the inner perimeter 303b of the heating ring 303 and an outer perimeter of the grounding plate 302. As stated above, the grounding plate 303 may be raised vertically above the heating ring 303 via spaces 451.

FIG. 4a shows a second antenna protector housing 400 enclosing or encapsulating the first antenna protector housing 300 and the heating ring 303. The second antenna protector housing 400 defines an inner void 400a. The heating ring 303 is located within the inner void 400a and is thus external to the first antenna protector housing 300. This configuration enables the first antenna protector housing 300 to serve as an additional barrier in the event moisture or debris leaks past the second antenna protector housing 400.

Other than the location of the heating ring 303, the first antenna protector housing 300 and the components confined therein are substantially similar to those discussed with reference to FIGS. 3a and 3b. The first antenna protector housing 300 defines an inner void 300a. The antenna assembly 301 sits on the grounding plate 302 located within the inner void 300a.

FIG. 4b is a cross sectional side view of the embodiment shown in FIG. 4a. The second antenna protector housing 400 includes a flat lower inner surface 400b. The second antenna protector housing 400 includes a lower outer surface (not shown) opposite the flat lower inner surface 400b and having a curvature matching the curvature of the vehicle roof such that the lower outer surface lies flush against the vehicle roof.

The heating ring 303 sits on the flat lower inner surface 400b. One or more spacers 451 raise the flat lower inner surface 300b of the first antenna protector housing 300 above the flat lower inner surface 400b of the second antenna protector housing and the heating ring 303. The spacers 451 may raise the bottom of the first antenna protector housing (and thus the flat lower inner surface 300b of the first antenna protector housing 300) vertically above a top-most surface of the heating ring 303.

The first antenna protector housing 300 encloses the antenna assembly 301 and the grounding plate 302. Note that the grounding plate 302 is sized and shaped to occupy the complete surface area of the flat lower inner surface 300b of the first antenna protector housing 300.

A plurality of temperature sensors 452 are configured to capture and report temperature readings to the computing system 100. A first temperature sensor 452a measures temperature of the outer perimeter 303a of the heating ring 303. A second temperature sensor 452b measures temperature of the inner void 400a of the second antenna protector housing 400. A third temperature sensor 452c measures temperature of the antenna assembly 301. A fourth temperature sensor 452d measures temperature of the inner void 300a of the first antenna protector housing 300. A fifth temperature sensor 452e measures temperature of the grounding plate 302. A sixth temperature sensor (not shown) is affixed to the vehicle 200 and configured to measure ambient temperature.

According to various embodiments, the third and fifth temperature sensors 452c, 452e are absent to avoid electromagnetic interference with signals produced by antenna assembly 301.

According to various embodiments, all temperature sensors are located vertically below the grounding plate 302 to avoid electromagnetic interference with signals produced by the antenna assembly 301. According to these embodiments, temperature sensor 452b is moved to a location along the second antenna protector housing 400 that is vertically below the grounding plate 302 (e.g., near the heating ring 303). Temperature sensor 452e is mounted below the grounding plate 302 adjacent to spacers 451. Temperature sensors 452d and 452c are excluded. Temperature sensor 452e is used as a proxy to estimate temperature of inner void 300a and/or temperature of antenna assembly 301. Similarly, temperature sensor 452a is mounted to heating ring 303 at a location vertically below grounding plate 302.

The first antenna protector housing 300 includes one or more apertures 453 to enable passage of heated air from void 400a to void 300a. The one or more apertures 453 may include sliding or rotating doors that enable the computing system 100 to selectively open and close each of the apertures 453. As discussed below, the computing system 100 may actuate (i.e., open and close) the doors of the apertures 453 based on the various temperature readings.

For example, the computing system 100 may close the apertures 453 when the temperature in inner void 300a exceeds a predetermined temperature as detected by the second temperature sensor 452d. The computing system may open the apertures 453 when the temperature in inner void 400a exceeds a predetermined temperature and the temperature in inner void 300a is below a predetermined temperature. This opening operation encourages heat to pass from inner void 400a to inner void 300a and warm antenna assembly 301.

When the ambient temperature sensor (not shown) detects sub-freezing temperatures, the computing system 100 may energize the heating ring 303 to keep temperature of the inner void 400a of the second antenna protector housing 400 above a predetermined temperature. This heating enables melting of ice or snow 800 located on the exterior of the second antenna protector housing 400.

FIG. 6 shows a third antenna protector housing 600 that covers the first housing protector 300. Unlike the shark-fin shaped second antenna protector housing 400, the third antenna protector housing is cone shaped with a vertically narrowing circular cross sectional area. A rotatable pole 601 extends through the center of the third antenna protector housing 600 and is affixed to a motor (not shown). The motor may be located within an inner void 600a of the third antenna protector housing 600. The pole 601 does not extend through the first antenna protector housing 400 and thus the first antenna protector housing 400 may be offset from the center of the third antenna protector housing 600.

Although not shown, the third antenna protector housing 600 may enclose the heating ring 303, similar to the second antenna protector housing 400. The third antenna protector housing 600 may include some or all of the sensors and controls discussed with reference to FIG. 4b (e.g., the temperature controls and the apertures with doors).

The pole 601 vertically extends to a junction 603, which links the pole 601 to one or more wipers 602. Rotation of the pole 601 is imparted, via the junction 603, to the one or more wipers 602a, 602b. The one or more wipers 602 sweep about exterior surfaces of the third antenna protector housing 600 and thus clear snow or ice 800 from the exterior surfaces of the third antenna protector housing 600. According to some embodiments, each of the wipers 602 is configured to execute a 360 degree rotation about the third antenna protector housing 600. The wipers 602 are curved to match the cone shape of the third antenna protector housing and may include any suitable wiper elements (e.g., a rubber wiper blade). The pole 601, the junction 603, and the wipers 602 are made of non-conductive material (e.g., a polymer) to avoid interference with signals generated by the antenna assembly 301.

The computing system 100 may automatically turn on the pole motor and sweep the wipers 602 upon detecting precipitation (e.g., snow or rain). The computing system 100 may detect precipitation via weather reports downloaded from the Internet or via moisture sensors mounted on the vehicle 200.

According to some embodiments, the motor for the pole 601 includes a torque sensor and a pole rotation sensor. The computing system 100 compares motor torque to a speed or rotation of the pole 601. Based on the comparison, the computing system 100 may predict ice or snow 800 covering the third antenna protector housing 600. For example, ice or snow 800 may impede rotation of the wiper 602, thus causing motor torque to rise or remain constant while speed or rotation of the pole 601 drops. When this occurs, the computing system 100 may energize or increase the heating rate of the heating ring 303. Stated differently, the computing system 100 may control the heating ring 303 based on motor torque and detected rotational speed of the pole 601. According to some embodiments, the pole 601 is absent and the motor is located at the junction 603.

It should be appreciated that instead of the wipers 602 rotating with respect to the third antenna protector housing 600, the third antenna protector housing 600 may rotate with respect to the wipers 602. More specifically, the wipers 602 may be fixed to the roof of the vehicle 200. The junction 603 may be absent. The pole 601 may spin or rotate the third antenna protector housing 600 against the fixed wipers 602.

The invention claimed is:

1. A vehicle comprising:
an antenna housing assembly including:
a first housing enclosing an antenna assembly and a grounding plate;
a second housing enclosing the first housing and a heating ring defining apertures and including resistive heating elements, wherein the antenna assembly and the grounding plate are located vertically above a top-most surface of the heating ring; and
a wiper blade driven by a motor and rotatable about the second housing to clear snow from an exterior of the second housing; and
processor(s) configured to transmit wireless signals via the antenna assembly.

2. The vehicle of claim 1, wherein the antenna housing assembly includes spacer(s) that raise the antenna assembly and the grounding plate vertically above the heating ring.

3. The vehicle of claim 2, wherein the second housing includes a lower inner surface and the spacer(s) and heating ring sit on the lower inner surface.

4. The vehicle of claim 1, wherein the resistive heating elements are circumferentially spaced from the apertures such that none of the resistive heating elements is located directly above or below one of the apertures.

5. The vehicle of claim 1, wherein none of the resistive heating elements are collinear with any of the apertures.

6. The vehicle of claim 1, wherein the grounding plate occupies an entire lower surface area of the first housing.

7. The vehicle of claim 1, wherein the first housing is shark-fin shaped and the second housing is cone shaped.

8. The vehicle of claim 1, wherein the processor(s) are configured to activate the motor based on received weather information.

9. The vehicle of claim 1, wherein weather information is received via a moisture sensor.

10. The vehicle of claim 9, wherein the weather information is received via the Internet.

11. The vehicle of claim 1, wherein the first housing encloses a first temperature sensor and defines an aperture selectively covered by a moveable door.

12. The vehicle of claim 11, wherein the processor(s) are configured to move the door based on a temperature detected by the first temperature sensor.

13. The vehicle of claim 12, wherein the second housing encloses a second temperature sensor and the processor(s) are configured to move the door based on temperatures detected by the first and second temperature sensors, wherein the first and second temperature sensors of the antenna housing assembly are located vertically below the grounding plate.

14. The vehicle of claim 1, wherein the processor(s) are configured to determine torque supplied to the motor and a rotational speed of the wiper blade.

15. The vehicle of claim 14, wherein the processor(s) are configured to activate the resistive heating elements based on the torque and the rotational speed.

16. The vehicle of claim 1, wherein the antenna assembly includes an antenna housing that encloses an antenna.

17. The vehicle of claim 16, wherein none of the resistive heating elements are collinear with any of the apertures and wherein the grounding plate occupies an entire lower surface area of the first housing.

18. A vehicle comprising:
an antenna housing assembly including:
a first housing enclosing an antenna assembly and a grounding plate; and
a second housing enclosing the first housing and a heating ring defining apertures and including resistive heating elements;
a wiper blade driven by a motor and rotatable about the second housing to clear snow from an exterior of the second housing; and
processor(s) configured to transmit wireless signals via the antenna assembly.

* * * * *